(12) United States Patent
Farquharson

(10) Patent No.: US 9,692,275 B2
(45) Date of Patent: Jun. 27, 2017

(54) ALTERNATIVE ENERGY GENERATOR

(71) Applicant: Aston Gustavous Farquharson, Stormville, NY (US)

(72) Inventor: Aston Gustavous Farquharson, Stormville, NY (US)

(*) Notice: Subject to any disclaimer, the term of this patent is extended or adjusted under 35 U.S.C. 154(b) by 201 days.

(21) Appl. No.: 14/737,001

(22) Filed: Jun. 11, 2015

(65) Prior Publication Data
US 2015/0364971 A1    Dec. 17, 2015

Related U.S. Application Data

(60) Provisional application No. 62/010,698, filed on Jun. 11, 2014.

(51) Int. Cl.
*H02K 7/06* (2006.01)
*H02K 7/116* (2006.01)
*H02K 21/24* (2006.01)

(52) U.S. Cl.
CPC ............. *H02K 7/116* (2013.01); *H02K 21/24* (2013.01)

(58) Field of Classification Search
CPC ................................ H02K 7/116; Y10S 74/09
USPC .................... 310/83, 47, 75 R; 74/DIG. 9
See application file for complete search history.

(56) References Cited

U.S. PATENT DOCUMENTS

| | | | |
|---|---|---|---|
| 1,723,857 A | 8/1929 | Hobart | |
| 4,343,239 A | 8/1982 | Seifert | |
| 4,353,003 A | 10/1982 | Sommers | |
| 4,397,150 A | 8/1983 | Paller | |
| 4,410,805 A | 10/1983 | Berley | |
| 4,798,986 A * | 1/1989 | Smith, Jr. | H02K 21/24 310/184 |
| 5,089,734 A * | 2/1992 | Bickraj | H02K 16/005 310/115 |
| 6,249,058 B1 | 6/2001 | Rea | |

(Continued)

FOREIGN PATENT DOCUMENTS

| | | |
|---|---|---|
| WO | 2010112685 A4 | 10/2010 |
| WO | 2010135484 A2 | 11/2010 |
| WO | 2011044144 A1 | 4/2011 |

OTHER PUBLICATIONS

Thomas, Shane, PCT/US15/59703, PCT Search Report & Written Opinion, Feb. 9, 2016, 15 pages.

(Continued)

*Primary Examiner* — Thanh Lam
(74) *Attorney, Agent, or Firm* — Madeline F. Schiesser; Keohane & D'Alessandro PLLC

(57) ABSTRACT

Approaches presented herein enable an alternative energy generator to generate electricity and scaled voltage by placing stationary rare earth magnets on a rotating plate in such a manner that an electric current is produced when the magnets on the plate are moved and the magnet flux lines cut across a stationary metal coil. More specifically, one or more stationary metal coils are positioned near a rotating plate on which a set of magnets are places, the metal coils oriented to be crossed by magnetic flux lines of the magnets. Alternatively, a set of magnets or metal coils are place on a rotating plate with one or more stationary magnets oriented near to yield crossed magnetic flux lines. The rotating plate may be driven by a motor, a hand crank, or any human motion with a set of gears to facilitate rotational torque.

20 Claims, 1 Drawing Sheet

(56) References Cited

U.S. PATENT DOCUMENTS

| | | | |
|---|---|---|---|
| 6,756,719 B1 | 6/2004 | Chiu | |
| 6,914,340 B2 * | 7/2005 | Becker | F21L 13/06 290/1 C |
| 7,190,088 B2 | 3/2007 | Heidel | |
| 7,723,880 B2 * | 5/2010 | Dai | H02K 7/1861 290/1 R |
| 7,902,708 B2 * | 3/2011 | Elmaleh | B60K 7/0007 310/10 |
| 8,717,098 B2 | 5/2014 | Cawley | |
| 8,791,615 B2 * | 7/2014 | Chang | H02K 7/02 310/114 |
| 2005/0173996 A1 | 8/2005 | Ellison | |
| 2006/0000215 A1 | 1/2006 | Kremen et al. | |
| 2007/0040385 A1 | 2/2007 | Uchiyama | |
| 2009/0095125 A1 | 4/2009 | Ekchian et al. | |
| 2010/0102570 A1 | 4/2010 | Boyd-Wilson et al. | |
| 2010/0213723 A1 | 8/2010 | Kazadi | |
| 2010/0301608 A1 | 12/2010 | Rush | |
| 2011/0084494 A1 | 4/2011 | Andujar | |
| 2011/0084495 A1 | 4/2011 | Wu et al. | |
| 2012/0091843 A1 | 4/2012 | Gore | |
| 2012/0204564 A1 | 8/2012 | Battaglia | |
| 2013/0009404 A1 | 1/2013 | Trachsell | |
| 2014/0159374 A1 | 6/2014 | Farquahrson et al. | |
| 2014/0159377 A1 | 6/2014 | Farquharson et al. | |

OTHER PUBLICATIONS

Lee W. Young, PCT Notification of Transmittal of the International Search Report and the Written Opinion of the International Searching Authority, or the Declaration, Date of Mailing Sep. 30, 2014, 9 pages.

* cited by examiner

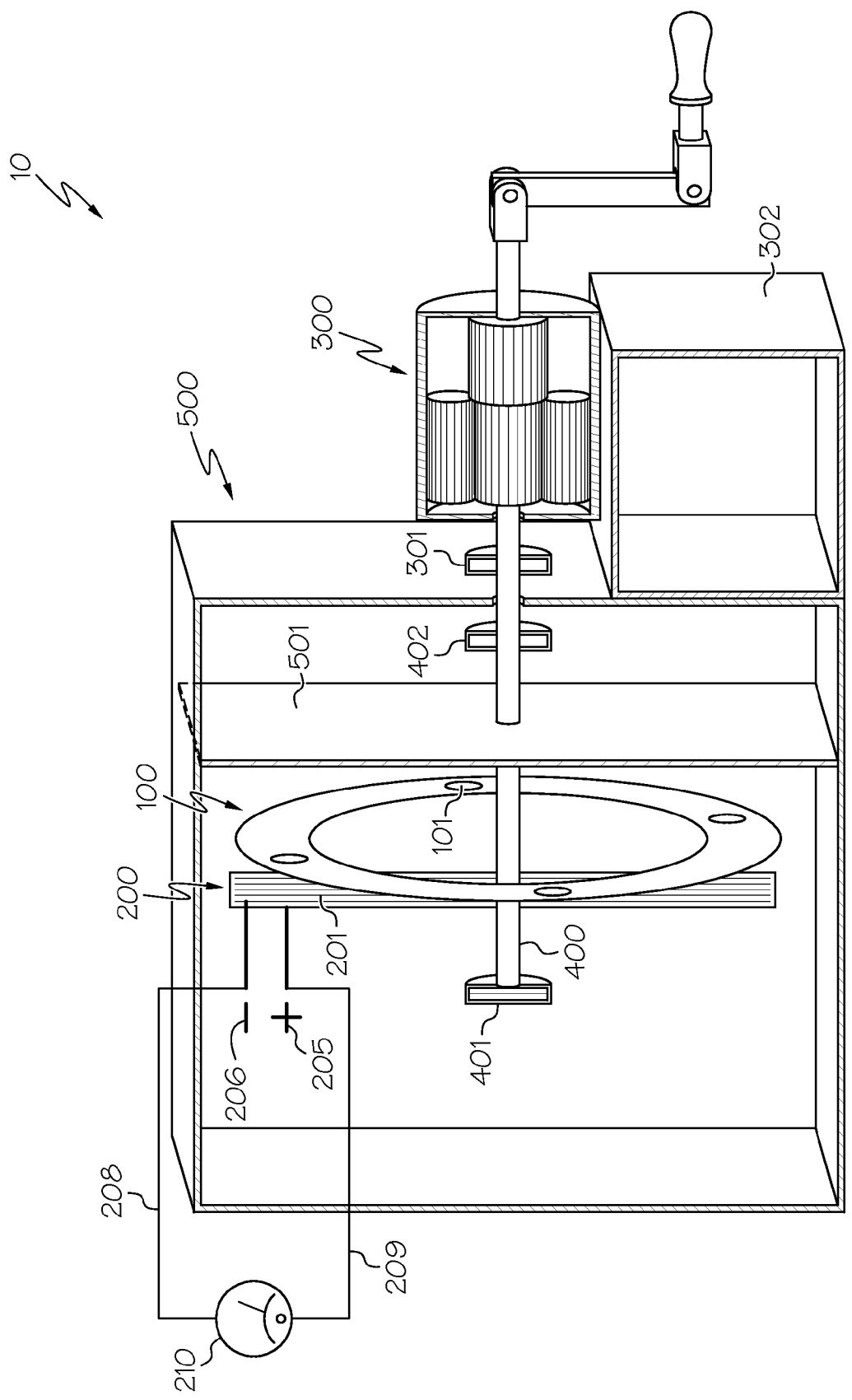

ALTERNATIVE ENERGY GENERATOR

RELATED U.S. APPLICATION DATA

The present patent document claims priority to U.S. provisional patent application Ser. No. 62/010,698, filed Jun. 11, 2014 and entitled "ALTERNATIVE ENERGY GENERATOR", the disclosure of which is incorporated herein by reference.

FIELD OF THE INVENTION

The present invention relates to a method and apparatus for generating electrical voltage from the motion or rotation of a mechanical apparatus or a motor, and relates more specifically to a method and apparatus for generating electrical voltage from an electromagnetic field.

BACKGROUND OF THE INVENTION

Energy may be generated from wind and solar energy sources as well as sources of fossils fuel. Alternative forms of generating electricity are important for many reasons. In general, windmills used to capture wind energy continue to prove costly, from complex manufacturing methods and the weight of requisite materials. Solar panels, in general, also provide a cost-ineffective source of energy, from expensive materials to undependable weather patterns. As such, there is a need for a cost-effective and easy-to-operate method and apparatus that may generate electricity continuously to produce an electrical field for the public use. Alternatively and more particularly, there is a need to use an alternative source of energy that is cost-effective and simple to operate and that also generates electricity continuously (e.g., seven days per week by twenty-four hours daily) to generate electricity.

SUMMARY OF THE INVENTION

Embodiments of the invention provide a stationary coil or coils positioned by or above or below or beside a magnet or a plate face magnet with one or more magnets (similar to an inner arrangement of a Shurite amp meter). One embodiment provides a generator device comprising one of at least one imbedded magnets or at least one imbedded coils held in a frame. In this embodiment, but not limited to this embodiment, the frame comprises a round holding plate comprising recesses wherein one or more than one magnets may be received, or one coil or more than one coils may be received). In the embodiment, the holding plate is fastened to a metal rod or shaft or two metal rods or shafts, which balance the holding plate on bearings at the ends of the shaft or shafts which are attached by the use of bearings and couplings. In the embodiment, the bearings are fastened to the walls of the generator frame such that when the coil(s) or magnet(s) rotate, the coil(s) or magnet(s) are balanced. In the embodiment, motion is induced at a speed in the plate holding the magnet(s) or coil(s) by a motor turning or rotating a rod or shaft attached to the motor at a proximate end and to the rod or shaft fastened to the holding plate at a distal end. The motor turns and/or rotates the holding plate magnet(s) or coil(s), which ultimately causes the induction of electric current when the magnet(s) or coil(s) cut across field or flux lines of one or more stationary coil(s) or magnet(s), respectively, within or around the frame. In related embodiments, the stationary magnet(s) may be provided in a variety of shapes and sizes and held in or around the frame so that when motion is induced in the magnet(s) or coil(s) held on the plate, the motion induces the production of an electric field and electric current.

In a first aspect of the present invention, an electrical energy generator device is provided, comprising: a rotating plate apparatus, the rotating plate apparatus having an axis of rotation; at least one metal coil disposed on the rotating plate apparatus; at least one stationary magnet, a magnetic flux field of the magnet being in contact with the metal coil; a driving shaft secured to the rotating plate apparatus along the axis of rotation; a mechanical movement delivery device secured to the driving shaft, and a set of gears having a least a two-to-one gear ratio in mechanical contact with the rotating plate apparatus and the mechanical movement delivery device via the driving shaft and being configured to increase torque along the driving shaft, wherein energy is generated when the metal coil passes through the magnetic flux field of the magnet, and wherein a voltage of the generated energy is proportionate to a gear ratio of the set of gears.

In another aspect of the present invention, an electricity generator is provided, comprising: a rotating plate apparatus, the rotating plate apparatus having an axis of rotation; at least one magnet disposed on the rotating plate apparatus; at least one stationary metal coil, a magnetic flux field of the magnet being in contact with the metal coil; an at least two-part driving shaft, a first part secured to a first side of the rotating plate apparatus and a second part secured to a second side of the rotating plate apparatus along the axis of rotation; a mechanical movement delivery device secured to the driving shaft, and a set of gears having a least a two-to-one gear ratio in mechanical contact with the rotating plate apparatus and the mechanical movement delivery device via the driving shaft and being configured to increase torque along the driving shaft, wherein energy is generated when the magnetic flux field of the magnet passes through the metal coil, and wherein a voltage of the generated energy is proportionate to a gear ratio of the set of gears.

In yet another aspect of the present invention, an electrical voltage generator is provided, comprising: a rotating coil apparatus disposed to rotate within an outer frame; a motor mechanically attached to the rotating coil apparatus; a stationary neodymium magnet disposed within the rotating coil apparatus; a first electrical wire in electrical contact with a first end of the rotating coil apparatus; a second electrical wire in electrical contact with second end of the rotating coil apparatus, the first and second wires forming a closed circuit having a load; a set of gears having a least a two-to-one gear ratio in mechanical contact with the rotating coil apparatus and the motor and being configured to increase torque along the driving shaft; and a protective partition plate disposed between the stationary neodymium magnet and the motor, wherein the motor has an initial voltage and the load registers an output voltage, and the output voltage is based on a gear ratio of the set of gears.

BRIEF DESCRIPTION OF THE DRAWINGS

These and other features of this invention will be more readily understood from the following detailed description of the various aspects of the invention taken in conjunction with the accompanying drawings in which:

The FIGURE is a side view of an embodiment of the present invention comprising a holding plate with a set of mounted magnets.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," "exemplary embodiments," or similar language, means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

Embodiments of the present invention provide a method and apparatus for generating electricity and/or amplifying a voltage by a metal coil of any size, or shape (e.g., substantially round or circular), or other electrical materials, in motion relative to a stationary magnet, or by a magnet of any size, shape, magnetic material, etc. in motion relative to a stationary metal coil. A mechanical device, any motor, or any human interactions may be employed to move one or more sets of coils or one or more sets of magnets such that the coils cuts across flux lines of a magnetic field created by stationary magnet(s) and/or the flux lines of the magnets engage stationary coils. This motion yields an electrical field or electricity.

Further embodiments of the present invention provide a method and apparatus for creating electricity on a tangible scale and amplifying a received level of voltage by a factor of two or more. In one embodiment, similar to an inner arrangement of a Shurite amp meter ('Shurite' is a registered trademark of Prime Technology, LLC), a magnet having a magnetic force can be placed in close proximity above, below, or beside a metal coil, wherein one of the magnet and the metal coil is driven to move, to create electricity.

In another embodiment, a stationary first magnet is provided above, below, or beside a rotatable metal loop/solenoid coil or second magnet. The one or more rotatable magnets or coils are caused to rotate at a constant 360 degrees through flux lines of the stationary one or more magnets, where electric currents are produced when the first magnet remains stationary while the second magnet(s) or coil(s) rotate. In another embodiment, the second magnet(s) or coil(s) may remain stationary while the first magnet rotates. When magnetic flux lines are crossed by the loop/solenoid coil or set of second magnets due to a mechanical force, a motor, or a human interaction causing the magnet(s) or coil(s) to rotate in motion (e.g., clockwise or anticlockwise), an electric current or voltage is induced.

Referring now to the FIGURE, in an embodiment, an energy generator device 10 is shown having one or more magnets 101 or one or more metal coils 201 (e.g., loop/solenoid coils) placed in Rotating Holding Plate Apparatus 100, which is configured to rotate due to a mechanical force, a motor, or a human interaction. In some embodiments, Rotating Holding Plate Apparatus 100 may be of any shape, but in one embodiment, this apparatus is shaped like a clock face with recesses in which one or more magnets or one or more coils are secured. For example, each "number" on the clock face of Rotating Holding Plate Apparatus 100 may represent a recess where a magnet or a coil resides, such that Rotating Holding Plate Apparatus 100 could have one magnet or one coil are as many as 10s or 100s or 1000$s$ of magnets or coils imbedded in Rotating Holding Plate Apparatus 100). Each coil or magnet may be held in place by any fastening material such as an adhesive like glue or any other material capable of holding the magnets or coils firmly in place such that when Rotating Holding Plate Apparatus 100 is rotated it remains stable. Mechanical means of fastening the coils or magnets to Rotating Holding Plate Apparatus 100 may also be employed, such as tacks, nails, wiring, etc. In some embodiments, the magnets are rare earth magnets. In embodiments, the rare earth magnets may include neodymium magnets, and/or samarium-cobalt magnets. As an alternative to a single magnet, an array of magnets may be employed on Rotating Holding Plate Apparatus 100.

In some embodiments, the one or more magnets 101 may be essentially the same sizes and have essentially the same surface Gauss. In other embodiments, the one or more magnets 101 may be different sizes with different surface Gausses from one another.

Likewise, in some embodiments, the one or more coils 201 may be the same sizes and have the same gauge wires. In other embodiments, the one or more coils 201 may be different gauge wires with different metal wires from one another. For example, coils 201 may comprise one or more of copper wires, silver wires, tungsten wires, gold wires and other conducting wires of different gauges.

In this and other embodiments, Rotating Holding Plate Apparatus 100 can be rotated by an attached mechanical movement delivery device 300 such as a motor, or a human interaction device (e.g., a hand crank, lever, push/pull string, rip cord, etc.) mechanically connected to Rotating Holding Plate Apparatus 100. For example, a motor may be operated by being plugged into an electrical outlet or by any independent source of energy such as fuel/gas. In another example, a person may turn Rotating Holding Plate Apparatus 100 or a mechanical tool in connection to Rotating Holding Plate Apparatus 100 in order to rotate Rotating Holding Plate Apparatus 100.

In some embodiments where Rotating Holding Plate Apparatus 100 comprises one or more magnets 101 and is configured to rotate, one or more stationary coils 201 may be secured in Stationary Device Apparatus 200. In this embodiment, magnets 101 of Rotating Holding Plate Apparatus 100 create magnetic flux lines which are brought into contact with the stationary coils 201, creating electricity.

In another embodiment, one or more metal coils 201 are placed and imbedded in Rotating Holding Plate Apparatus 100, which can be rotated by mechanical movement delivery device 300 (e.g., a motor, or a human interaction device like a hand crank) mechanically connected to Rotating Holding Plate Apparatus 100. In some embodiments, Rotating Holding Plate Apparatus 100 comprises essentially of a single round metal coil. One or more magnets 101 may be placed and embedded on Stationary Device Apparatus 200 to create flux lines in close proximity to the rotating coil, thereby yielding electricity.

In some embodiments, Rotating Holding Plate Apparatus 100 and Stationary Device Apparatus 200 may be circular plate-like devices and may be situated parallel to one another, sharing a common axis, where the common axis may be shaft 400.

In a related embodiment (still referring to the FIGURE, Rotating Holding Plate Apparatus 100 is attached to shaft 400 secured into bearings 401 and 402 located on opposite sides of Generator Frame 500 of generator device 10 and secured by bearings and couplings into the walls of a Generator Frame 500 surrounding Rotating Holding Plate Apparatus 100. In some embodiments, shaft 400 may further extend through bearing/support 301 to mechanical movement delivery device 300. Electrical wires 208 and 209 are attached to Stationary Device Apparatus 200 (in the case Stationary Device Apparatus 200 comprises coils 201) or to via brushes to Rotating Holding Plate Apparatus 100 (in the case Rotating Holding Plate Apparatus 100 comprises coils 201) with positive end 205 and negative end 206 of the wires to meter 210 for the electric circuit. Accordingly, in one example, electricity is generated by rotating (e.g., via a motor) the attached Rotating Holding Plate Apparatus 100 comprising coils 201 while single and separate shafts 400 is attached to either side of Rotating Holding Plate Apparatus 100 with wires 208 and 209 having brushes for positive end 205 and negative end 206 attached to respective shafts 400, creating electricity, which is transmitted through the brushes to meter 210 (or any other load), while Stationary Device Apparatus 200 with magnets 101 remains stationary. In the alternative example, electricity is transmitted to wires 208 and 209 having positive end 205 and negative end 206 attached to Stationary Device Apparatus 200 comprising coils 201 while Rotating Holding Plate Apparatus 100 comprising magnets 101 rotates.

In some embodiments, a set of gears is disposed between Holding Plate Apparatus 100 and mechanical movement delivery device 300, and may be incorporated in, along, or at a proximate end of shaft 400 to receive mechanical movement from mechanical movement delivery device 300. The set of gears may comprise driving gears and one or more idler gears/driven gears for providing or facilitating the application of torque and/or work (e.g., foot-pounds) to Rotating Holding Plate Apparatus 100. In one example, the set of gears may provide a least a two-to-one (2-1) gear ratio, although other ratios are envisioned, such as three-to-one (3-1), ten-to-one (10-1), one-hundred-to-one (100-1) and so forth. The gear ratio facilitates an angular torque in shaft 400, which makes Rotating Holding Plate Apparatus 100 easy to turn with little initial force or work. Furthermore, this low initial required work enables energy generator 10 to yield a voltage which is several fold greater than a voltage corresponding to the initial work. For example, depending on the gear ratio, energy generator 10 may yield a voltage which is twice, three times, ten times, or even one-hundred times greater than an input voltage.

In an embodiment, a method of generating electrical current and amplifying voltage is provided. In this embodiment, a single shaft 400 is provided for Rotating Holding Plate Apparatus 100 wherein the one or more imbedded magnets 101 are being rotated or placed in motion wherein only one shaft holding Rotating Holding Plate Apparatus 100 is used to generate electricity while Stationary Device Apparatus 200 with coils is stationary. In this embodiment, positive 205 and negative 206 wires are secured to Stationary Device Apparatus 200 and accordingly, wire brushes are not used to transmit the generated electricity. Shaft 400 is secured into the walls of Generator Frame 500 on either side of Rotating Holding Plate Apparatus 100.

Another embodiment provides a method of generating electricity and amplifying voltage wherein rectangular coils or square coils 201 (e.g., a trapezium, a trapezoidal and other like shapes) are used wherein the ends of a coil or coils passes in close proximity to magnet 101, cutting across magnet flux lines wherein the one or more coils 201 rotate or the one or more magnets rotate. In the latter case, the one or more magnets 101 pass each end of the one or more coils 201 wherein each end of the one or more coils 201 generates electricity in one 360 revolution. In this case, electricity is generated double in a 360 degree rotation wherein one coil can, for example increase by a factor of two (2), an originally input voltage. Likewise, two (2) coils may generate four (4) times the electricity (e.g., four-fold an input electrical voltage), and three (3) coils may generate six (6) times the electricity, wherein as coils are added into the magnetic field, each coil yields an amplified electrical voltage output. Any number of coils 201 may be added, so long as the coils are located to pass through a magnetic field of magnet 101 of Rotating Holding Plate Apparatus 100. The former case works on much the same manner.

In all the foregoing embodiments, any mechanical movement delivery device 300, any motor, or any human or animal actions can rotate Rotating Holding Plate Apparatus 100 comprising coils 201 or magnets 101 in a 360 degree motion. The greater the gear ratio associated with shaft 400, the easier Rotating Holding Plate Apparatus 100 is to initially turn and to continue turning. Once in motion, the momentum of Rotating Holding Plate Apparatus 100 will keep Rotating Holding Plate Apparatus 100 in motion for a considerable time period (i.e., angular momentum) without any additional source of energy pushing the magnet Rotating Holding Plate Apparatus 100. Furthermore, Rotating Holding Plate Apparatus 100 requires a relatively low starting energy to be place in motion. For example, a human could set Rotating Holding Plate Apparatus 100 rotating with only a few lbs. of force (e.g., 10-50 lbs.) or the equivalent work.

Embodiments of the present invention also include a receiving load. In an example embodiment chosen for the purpose of disclosure, the receiving load is an amp meter (also referred to herein as "scale") 210. Scale 210 is merely as an example relating to the fact that an electric current is shown generated in embodiments of the present invention. Scale 210 may also be referred to or regarded herein as a receiving load that ultimately makes use of the electric current generated.

In an embodiment of the present invention the one or more coils 201 are made of copper to produce and transmit electricity. Coils 201 can be made from any metals, including but not limited to one or more of gold, silver, tungsten etc. Copper wire is a cost-effective and good conductor of electricity when in motion rotating around a magnet. According to Faraday's law, electricity is produced whenever relatively moving magnetic lines of force between one or more magnets 101 cut across one or more copper loop wire coils 201, which is part of a complete circuit. This may occur when either of the copper loop wire coils 201 are in motion, or when the magnets 101 are in motion (due to a mechanical force delivered by mechanical movement delivery device 300, a motor, human actions, etc. driving motion) wherein the coils 201 or magnets 101 rotate, generating electricity.

Winding copper coils 201 in some embodiments are formed by winding a long copper wire in the shape of a spiral. The copper coils 201 act like a magnet when current is turned on. The copper coil 201 possesses similar magnetic lines of force around it as an ordinary magnet does. As mentioned above, whenever magnetic lines cut across the winding copper coils 201 in a full circuit, based on, revolutions per minute, an electric current is generated within the axle or coil spring of Scale 210 or other receiving load.

In some embodiments, mechanical movement delivery device 300 may comprise any mechanical force, or force delivery system, or any motor of any size. Mechanical movement delivery device 300 provides a high level of initial torque via shaft 400 and the gear set to Rotating Holding Plate Apparatus 100, on which one of at least one magnet 101 or at least one metal coil 201 resides and interacts with at least one stationary metal coil or at least one stationary magnet, respectively.

Referring now to element 302, in some embodiments a single off-center magnet 302 provides magnetic flux lines that cut across Rotating Holding Plate Apparatus 100 having at least one metal coil 201. The mechanical operation of energy generator 10 remains the same as described above. For example, as Rotating Holding Plate Apparatus 100 spins or rotates on shaft 400, coils 201 thereon disposed cut through the flux lines of magnets 201, causing electrical current to be generated. Although in the figure off-center magnet 302 is shown to the side of the coil, the off-center magnet 302 may be situated anywhere that, as the coil spins, the flux lines of off-center magnet 302 are crossed.

In this embodiment, off-center magnet 302 creates an electric field and induces electric current whether off-center magnet 302 is inside or outside the at least one coils 201, as long as the at least one coils 201 are in motion and there is always a present of one of the magnets. Or vice versa, if any outside magnets 101 is in motion and is near the at least one coils 201, an electric field or electric current is created.

Additionally, in another embodiment, Holding Plate Apparatus 100 may be configured to have linear motion instead of rotational motion. For example, a constant alternating back and forth position may be used in creating an electrical field when passing a magnetic field near a coil.

In another embodiment of the invention, a single off-center coil 201 (e.g., located atop frame 500) is present in energy generator device 10, which is cut across by at least one magnet 101 of Rotating Holding Plate Apparatus 100. The mechanical operation of energy generator 10 remains the same as described above. As magnet(s) 101 spins, the flux lines are cut across by the coil 201, causing electrical current to be generated. Although in this example the coil 201 is described as above magnet(s) 101, coil 201 may be situated anywhere that, as magnet(s) 101 spin, the flux lines of the magnet(s) 101 cut across coil 201.

In this embodiment, off-center coil 201 creates an electric field and induces electric current whether magnet(s) 101 are inside or outside coil 101, because one of the coils or magnets are in motion and the other is stationary. The opposite may also be applied in another embodiment in which an outside magnet 101 is in motion and is near the stationary coil 101 to create an electric field or electric current.

Additionally, in alternative embodiments, the coil, magnet, and/or Holding Plate Apparatus 100 may be configured to have linear motion instead of rotational motion. For example, a constant alternating back and forth position may be used in creating an electrical field when passing a magnetic field near the coil.

In this embodiment, if more than one coil is used, the coils can either be placed or connected in parallels or paralleled or in series to generate more or less electric current and power, respectively, based on a desired electrical and voltage output.

In general, embodiments of the present invention provide a method and apparatus for generating electricity and amplified voltage by a coil of any size, or shape, or other electrical materials and a magnet of any size, shape, material, etc., one of which is in motion. Motion of at least one coil or at least one magnet is produced by a mechanical device, any motor, or human/animal interactions. A moving coil cuts across flux lines of a magnetic field created by a magnet creating an electrical field or electricity, or vice versa in the case a magnet is moving.

In some embodiments, it may be desirable to decrease the force of the magnetic field created by at least one magnet 101 to avoid magnetic interference with a motor, mechanical movement delivery device 300 other like mechanical devices or apparatuses. Magnets, like electrons, protons, neutrons, have magnetic poles surrounding a mass. Magnetic force, like electric force, like the electrostatic force, all vary inversely by the square of the distance, like gravitation. Accordingly, in some embodiments, Partition Plate 501 is provided to protect mechanical movement delivery device 300 from electro-magnetic interference. Partition Plate 501 may be comprised of any metal or wood or plastic or heat material or any hard material to block electro-magnetic interference or other like substance serving to block or decrease or minimize the flux lines of magnets 101, which prevents interference with mechanical movement delivery device 300 or other like devices or apparatuses. For example, Uranium rock material and/or the metal lead may be employed as substances to form Partition Plate 501 that would serve to block or minimize electro-magnetic interference flux lines of magnets 101.

It should be noted that several various embodiments are described herein with reference to the figure. Accordingly, not all elements shown in the figure are present in each embodiment, and in some embodiments, the elements may be arranged in a different configuration. The figure is not intended to be limiting.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. An electrical energy generator device, comprising:
   a rotating plate apparatus, the rotating plate apparatus having an axis of rotation;

at least one metal coil disposed on the rotating plate apparatus;

at least one stationary magnet, a magnetic flux field of the magnet being in contact with the metal coil;

a driving shaft secured to the rotating plate apparatus along the axis of rotation;

a mechanical movement delivery device secured to the driving shaft; and a set of gears having a least a two-to-one gear ratio in mechanical contact with the rotating plate apparatus and the mechanical movement delivery device via the driving shaft and being configured to increase torque along the driving shaft, wherein energy is generated when the metal coil passes through the magnetic flux field of the magnet, and wherein a voltage of the generated energy is proportionate to a gear ratio of the set of gears.

2. The electrical energy generator device of claim 1, wherein the rotating plate apparatus is rotated through the magnetic flux field.

3. The electrical energy generator device of claim 2, wherein the rotation is in response to a mechanical force being applied to the mechanical movement delivery device.

4. The electrical energy generator device of claim 1, wherein the at least one stationary magnet is a rare earth magnet.

5. The electrical energy generator device of claim 1, further comprising:
a stationary holding device on which the magnet is disposed, the stationary holding device having a central axis and the central axis being in line with the axis of rotation of the rotating plate apparatus.

6. The electrical energy generator device of claim 1, further comprising a load.

7. The electrical energy generator device of claim 6, further comprising:
a positive wire attached along the shaft having a distal wire brush end in electrical contact with the coil and a proximate end in electrical contact with the load; and
a negative wire attached along the shaft having a distal wire brush end in electrical contact with the coil and a proximate end in electrical contact with the load.

8. The electrical energy generator device of claim 1, further comprising a base and frame to which the driving shaft is rotatably secured.

9. The electrical energy generator device of claim 1, the mechanical movement delivery device comprising a human operated device, wherein the human operated device initiates angular torque along the shaft sufficient to rotate the rotating plate apparatus.

10. The electrical energy generator device of claim 1, wherein the least one metal coil is a plurality of metal coils, wherein a voltage is generated when the plurality of metal coils passes through the magnetic flux field of the magnet and the voltage generated is proportional to a quantity of metal coils.

11. An electricity generator, comprising:
a rotating plate apparatus, the rotating plate apparatus having an axis of rotation;
at least one magnet disposed on the rotating plate apparatus;
at least one stationary metal coil, a magnetic flux field of the magnet being in contact with the metal coil;
an at least two-part driving shaft, a first part secured to a first side of the rotating plate apparatus and a second part secured to a second side of the rotating plate apparatus along the axis of rotation a mechanical movement delivery device secured to the driving shaft; and a set of gears having a least a two-to-one gear ratio in mechanical contact with the rotating plate apparatus and the mechanical movement delivery device via the driving shaft and being configured to increase torque along the driving shaft, wherein energy is generated when the magnetic flux field of the magnet passes through the metal coil, and wherein a voltage of the generated energy is proportionate to a gear ratio of the set of gears.

12. The electricity generator of claim 11, wherein the magnet comprises a rare earth magnet.

13. The electricity generator of claim 12, wherein the rare earth magnet comprises one of: a neodymium magnet and a samarium-cobalt magnet.

14. The electricity generator of claim 11, wherein rotating plate apparatus is rotated in response to a mechanical force being applied to the mechanical movement delivery device.

15. The electricity generator of claim 11, further comprising:
a stationary holding device on which the coil is disposed, the stationary holding device having a central axis and the central axis being in line with the axis of rotation of the rotating plate apparatus.

16. The electricity generator of claim 11, further comprising:
a load;
a positive wire attached along the shaft having a distal wire brush end in electrical contact with the coil and a proximate end in electrical contact with the load; and
a negative wire attached along the shaft having a distal wire brush end in electrical contact with the coil and a proximate end in electrical contact with the load.

17. The electricity generator of claim 11, further comprising a base and frame to which the at least two-part driving shaft is rotatably secured.

18. The electricity generator of claim 11, the mechanical movement delivery device comprising a human operated device, wherein the human operated device initiates angular torque along the shaft sufficient to rotate the rotating plate apparatus.

19. The electricity generator of claim 11, wherein the magnet is a plurality of magnets, wherein a voltage is generated when magnetic flux fields of the plurality of magnets passes through the metal coil and an output voltage is amplified from an input voltage.

20. An electrical voltage generator, comprising:
a rotating coil apparatus disposed to rotate within an outer frame;
a motor mechanically attached to the rotating coil apparatus;
a stationary neodymium magnet disposed within the rotating coil apparatus;
a first electrical wire in electrical contact with a first end of the rotating coil apparatus;
a second electrical wire in electrical contact with second end of the rotating coil apparatus, the first and second wires forming a closed circuit having a load;
a set of gears having a least a two-to-one gear ratio in mechanical contact with the rotating coil apparatus and the motor and being configured to increase torque along the driving shaft; and
a protective partition plate disposed between the stationary neodymium magnet and the motor, wherein the motor has an initial voltage and the load registers an output voltage, and the output voltage is based on a gear ratio of the set of gears.

* * * * *